US012567785B2

(12) United States Patent
Yoshihara et al.

(10) Patent No.: US 12,567,785 B2
(45) Date of Patent: Mar. 3, 2026

(54) TEMPERATURE SENSOR AND ROTARY ELECTRIC MACHINE

(71) Applicant: SHIBAURA ELECTRONICS CO., LTD., Saitama (JP)

(72) Inventors: Takamasa Yoshihara, Saitama (JP); Masanori Kirihara, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 440 days.

(21) Appl. No.: 18/315,729

(22) Filed: May 11, 2023

(65) Prior Publication Data

US 2023/0396132 A1 Dec. 7, 2023

(30) Foreign Application Priority Data

Jun. 7, 2022 (JP) ................................. 2022-092020
Mar. 23, 2023 (JP) ................................. 2023-046203

(51) Int. Cl.
| | |
|---|---|
| *H02K 11/25* | (2016.01) |
| *G01K 1/08* | (2021.01) |
| *G01K 1/14* | (2021.01) |
| *G01K 7/22* | (2006.01) |

(52) U.S. Cl.
CPC .............. *H02K 11/25* (2016.01); *G01K 1/08* (2013.01); *G01K 1/14* (2013.01); *G01K 7/22* (2013.01)

(58) Field of Classification Search
CPC . H02K 11/25; G01K 1/08; G01K 1/14; G01K 7/22; G01K 7/16; Y02T 10/64
See application file for complete search history.

(56) References Cited

U.S. PATENT DOCUMENTS

| | | | | |
|---|---|---|---|---|
| 2012/0111145 A1* | 5/2012 | Maekawa | ............. | B60L 3/0061 |
| | | | | 180/65.245 |
| 2014/0184031 A1* | 7/2014 | Kaneshige | ............. | H02K 11/25 |
| | | | | 310/68 B |
| 2014/0254632 A1* | 9/2014 | Kaneshige | ............... | G01K 1/14 |
| | | | | 374/208 |

(Continued)

FOREIGN PATENT DOCUMENTS

| | | |
|---|---|---|
| JP | 2003-092858 A | 3/2003 |
| JP | 2008-178222 A | 7/2008 |
| JP | 2010-252508 A | 11/2010 |

OTHER PUBLICATIONS

Japanese Office action for JP2022-092020.

*Primary Examiner* — Nathaniel T Woodward
*Assistant Examiner* — Philip L Cotey
(74) *Attorney, Agent, or Firm* — McDonald Hopkins LLC

(57) ABSTRACT

A temperature sensor detecting a temperature of a coil provided in a stator of a rotary electric machine includes a sensor element and a holder made of a resin. The sensor element includes a thermosensitive body, electric wires connected to the thermosensitive body, and a covering body having an elongated shape and covering the thermosensitive body, clad wires, and a part of lead wires. The holder holds one end region of the covering body on the electric wire side in a state where a longitudinal direction of the covering body is inclined relative to a temperature measurement object region of the coil. The holder is attached to the rotary electric machine in such a manner that another end region of the covering body on the thermosensitive body side is in contact with the temperature measurement object region.

12 Claims, 7 Drawing Sheets

(56) References Cited

U.S. PATENT DOCUMENTS

| | | | | |
|---|---|---|---|---|
| 2015/0155760 A1* | 6/2015 | Bessho | ................. | H02K 11/25 |
| | | | | 310/68 C |
| 2017/0184457 A1* | 6/2017 | Maeno | .................... | H01F 27/02 |
| 2018/0017446 A1* | 1/2018 | Yoshihara | ............. | H02K 11/25 |
| 2018/0156669 A1* | 6/2018 | Koyama | ................ | G01K 13/08 |
| 2020/0393306 A1* | 12/2020 | Yoshihara | ............... | G01K 1/14 |
| 2020/0395822 A1* | 12/2020 | Hayashi | ................. | H02K 11/25 |
| 2021/0211022 A1* | 7/2021 | Schmitt | ................... | H02K 3/28 |
| 2022/0149691 A1* | 5/2022 | Willacker | ............... | H02K 3/50 |
| 2025/0226730 A1* | 7/2025 | Narita | ................... | G01K 1/143 |

* cited by examiner

TEMPERATURE SENSOR AND ROTARY ELECTRIC MACHINE

BACKGROUND OF THE INVENTION

Field of the Invention

The present invention relates to a temperature sensor, and a rotary electric machine including the temperature sensor.

Description of the Related Art

In a rotary electric machine such as an electric motor mounted on, for example, a vehicle, a temperature of a coil provided in a stator rises when a current flows through the coil. To avoid excessive temperature rise of the coils and to stably operate the rotary electric machine, the temperature of the coil is detected by a temperature sensor, and operation of the rotary electric machine is controlled based on the detected temperature.

JP 2010-252508 A proposes that, in a stator of a rotary electric machine mounted on a vehicle, a temperature sensor is inserted into a gap between coils wound around teeth adjacent to each other in a peripheral direction, to detect a temperature of the coil. The temperature sensor disclosed in JP 2010-252508 A is covered with an insulation resin layer, and is held by a holder made of an elastic material such as fluoro-rubber. When the temperature sensor is inserted into the gap between the coils while the holder is elastically deformed, a temperature detection unit of the temperature sensor comes into contact with the coil through the resin layer.

Even under an environment where the temperature sensor receives vibration, for example, in a vehicle, it is desirable to prevent the temperature sensor from being displaced from a prescribed position on the coil.

To do so, the temperature sensor can be supported by a metal bracket fixed to a member or the like of the stator. However, the metal bracket is higher in cost than a bracket, a holder, and the like made of resin.

In a case of the temperature sensor described in JP 2010-252508 A inserted into the gap between the coils, attachment of the temperature sensor into the gap between the coils is complicated, and positioning of the temperature sensor on the coil is difficult. Further, it is difficult to detach the temperature sensor after installation.

The present invention is directed to a temperature sensor that can be prevented from being displaced from a prescribed position of a coil caused by an external force such as vibration while suppressing a cost, and is easily attached to and detached from the coil, and also directed to a rotary electric machine including the temperature sensor.

SUMMARY OF THE INVENTION

According to the present invention, a temperature sensor detecting a temperature of a coil provided in a stator of a rotary electric machine, includes: a sensor element including a thermosensitive body, an electric wire electrically connected to the thermosensitive body, and a covering body having an elongated shape and covering a part of the electric wire and the thermosensitive body; and a holder made of a resin and configured to hold one end region of the covering body on the electric wire side in a state where a longitudinal direction of the covering body is inclined relative to a temperature measurement object region of the coil. The holder is attached to the rotary electric machine in such a manner that another end region of the covering body on the thermosensitive body side is in contact with the temperature measurement object region.

Further, according to the present invention, a temperature sensor detecting a temperature of a coil provided in a stator of a rotary electric machine, includes: a sensor element including a thermosensitive body, an electric wire electrically connected to the thermosensitive body, and a covering body having an elongated shape and covering a part of the electric wire and the thermosensitive body; and a holder made of a resin and configured to hold the sensor element and to fix the sensor element to the rotary electric machine. The holder includes a fixed portion configured to fix the sensor element to the stator, and a holding portion inclined relative to the fixed portion and configured to hold one end region of the covering body on the electric wire side.

A rotary electric machine according to the present invention includes: a stator including a core and a coil; a rotor configured to be rotated relative to the stator; and the above-described temperature sensor configured to detect a temperature of the coil.

According to the present invention, only the other end region of the covering body having the one end region held by the holder abuts on the coil and comes into contact with the coil while deforming. As a result, the sensor element is positioned in a predetermined region of the coil, and the state is maintained. Therefore, it is unnecessary to position the sensor element by pressing the sensor element against the temperature measurement object region by an arm or the like of a metal bracket. According to the present invention, it is sufficient for the temperature sensor to include the thermosensitive element including the thermosensitive body and the electric wire, the covering body protecting the thermosensitive element from an external force, and the resin holder maintaining the state where the other end region of the covering body is in contact with the temperature measurement object region of the coil. Therefore, it is possible to prevent the temperature sensor from being displaced from the prescribed position of the coil caused by an external force such as vibration and impact while suppressing the cost as compared with a case of including a metal member.

In addition, when the holder is fixed to the supporting body, the other end region of the covering body held by the holder comes into contact with the temperature measurement object region of the coil. Therefore, for example, as compared with a case where the temperature sensor is inserted into a gap between the coils while the holder is elastically deformed, it is possible to easily attach and detach the temperature sensor to/from the coil.

DETAILED DESCRIPTION OF THE PREFERRED EMBODIMENTS

Some embodiments of the present invention are described below with reference to accompanying drawings.

Configuration examples of a temperature sensor and a rotary electric machine including the temperature sensor are described in a first embodiment, a second embodiment, and a modification. These configuration examples are different in direction in which the temperature sensor comes into contact with a coil of a stator of the rotary electric machine.

First Embodiment

Entire Configuration

Figure 1:
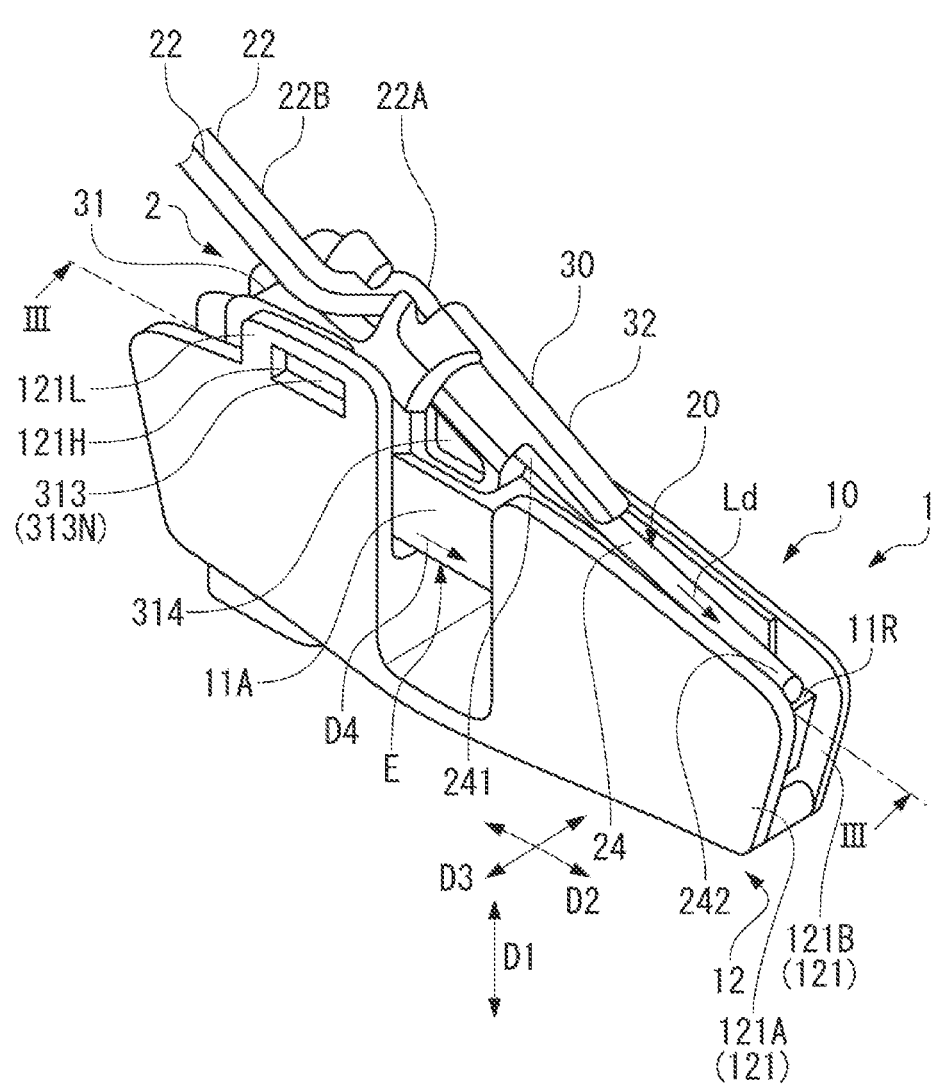
FIG. 1 is a perspective view illustrating a part of a rotary electric machine and a temperature sensor according to a first embodiment.
Figures 2A, 2B:
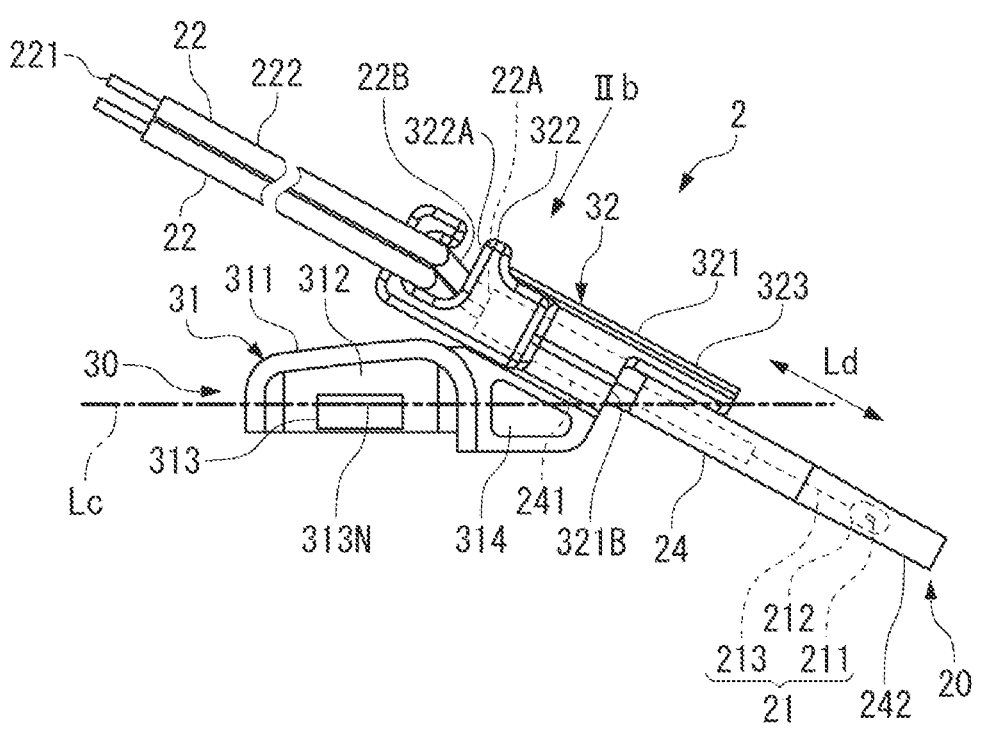
FIG. 2A is a plan view of the temperature sensor illustrated in FIG. 1.
FIG. 2B is a side view of the temperature sensor as viewed from an arrow IIb in FIG. 2A.
Figure 3:
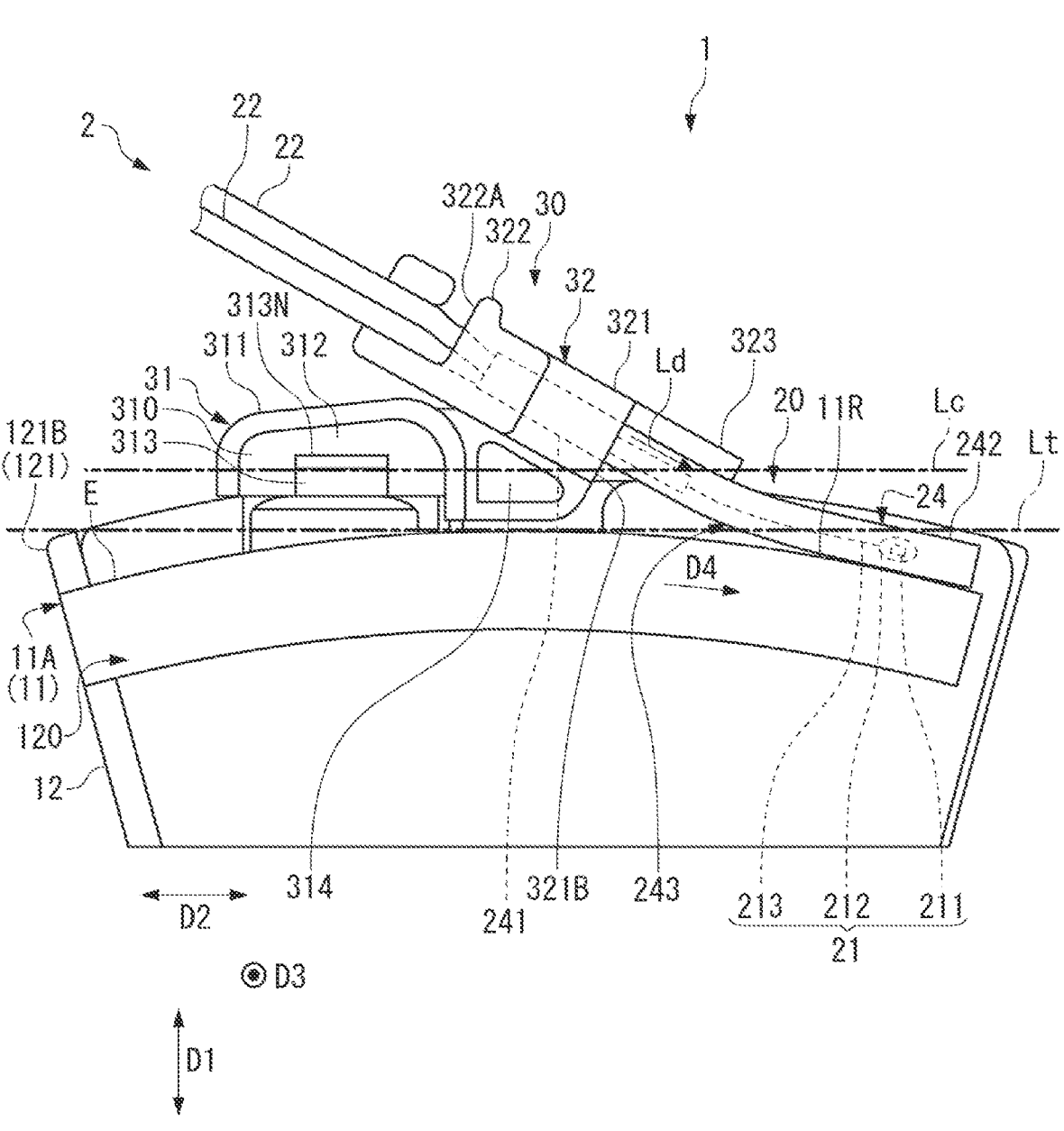
FIG. 3 is a side view of the temperature sensor taken along line in FIG. 1.

A temperature sensor 2 illustrated in FIG. 1 to FIG. 3 is attached to a stator 10 of a rotary electric machine 1 such as an electric motor, and detects a temperature of a coil 11 of the stator 10. The rotary electric machine 1 is mounted on a vehicle such as an electric vehicle. FIG. 1 illustrates only a vicinity of a coil end of the stator 10. The rotary electric machine 1 includes the stator 10, an unillustrated rotor rotated relative to the stator 10, and the temperature sensor 2.

In each of the figures, an axial direction D1, a peripheral direction D2, and a radial direction D3 of the stator 10 are illustrated by arrows.

The stator 10 includes an unillustrated core that is a stacked body of a plurality of magnetic steel sheets, a member supporting the core, and the coil 11 wound around teeth provided on the core. A supporting body 12 that is made of an insulation resin material and supports a coil end E is disposed between the teeth and the coil 11.

The coil 11 corresponds to a concentrated winding coil, and includes a plurality of coil elements 11A arranged in the peripheral direction D2 of the stator 10. FIG. 1 illustrates only one coil element 11A.

As illustrated in FIG. 1 and FIG. 3, the temperature sensor 2 is pressed in the axial direction D1 to come into contact with an end part (hereinafter, coil end E) of the coil element 11A in the axial direction D1 of the stator 10, thereby detecting a temperature of the coil end E.

The supporting body 12 includes plate-like supporting pieces 121 arranged in the radial direction D3 of the stator 10, and supports the coil end E by the supporting pieces 121. The coil end E is housed in a housing portion 120 (see FIG. 3) formed by the supporting pieces 121. The supporting body 12 is fixed to an appropriate member such as a component of the stator 10.

A temperature measurement object region 11R with which the temperature sensor 2 comes into contact is set between adjacent supporting pieces 121 (121A and 121B) at the coil end E. Each of the supporting pieces 121A and 121B includes a locking portion 121L that has a substantially rectangular shape and locks members of the temperature sensor 2. Each of the locking portions 121L includes a rectangular locking hole 121H that penetrates through the locking portion 121L in a thickness direction.

Configuration and Action of Temperature Sensor

A configuration of the temperature sensor 2 according to the present invention is described with reference to FIGS. 2A and 2B.

As illustrated in FIGS. 2A and 2B, the temperature sensor 2 includes a sensor element 20 and a holder 30 holding the sensor element 20. The sensor element 20 includes a thermosensitive element 21, paired lead wires 22 electrically connected to the thermosensitive element 21, and a covering body 24.

The thermosensitive element 21 includes a thermosensitive body 211 having an electric resistance varied with change in temperature, an insulation sealing material 212 covering the thermosensitive body 211, and paired clad wires 213 that are electrically connected to the thermosensitive body 211 and are drawn out from the sealing material 212. The thermosensitive body 211 corresponds to, for example, a thermistor. The clad wires 213 correspond to, for example, Dumet wires. The paired clad wires 213 are drawn out in the same direction.

The paired lead wires 22 are individually connected to the respective clad wires 213, and constitute "electric wire" together with the clad wires 213. Each of the lead wires 22 includes a core wire 221 joined with the corresponding clad wire 213, and an insulation coating 222 covering the core wire 221. The paired lead wires 22 are connected to an unillustrated temperature detection circuit.

The covering body 24 is provided so as to cover the whole of the thermosensitive element 21 and a predetermined range of the lead wires 22, and protects the thermosensitive element 21 and joint portions between the thermosensitive element 21 and the lead wires 22, from an external force applied from outside. The covering body 24 is formed in an elongated shape long in a direction in which the clad wires 213 are drawn out from the sealing material 212. A longitudinal direction of the covering body 24 is denoted by Ld. The covering body 24 includes a first region 241 corresponding to a region on one end side in the longitudinal direction Ld, and a second region 242 communicating with the first region 241 and corresponding to a region on the other end side in the longitudinal direction Ld.

The covering body 24 according to the present embodiment is formed to have, for example, a columnar outer shape, and has a circular cross-section, the diameter of which is substantially constant from the first region 241 where the lead wires 22 are drawn out, to the second region 242 where the thermosensitive body 211 is positioned. Note that the cross-section of the covering body 24 is not limited to the circular shape, and may have an optional shape, for example, a rectangular shape. Alternatively, the covering body 24 may be partially different in shape, for example, may be formed in a tapered shape in which only the second region 242 is thinner than the other portions.

The covering body 24 according to the present embodiment is made of an elastic material such as fluoro-rubber and silicone rubber. The fluoro-rubber corresponds to, for example, polytetrafluoroethylene (PTFE) or a tetrafluoroethylene-perfluoroalkyl vinyl ether copolymer (PFA). For example, the thermosensitive element 21 and the lead wires 22 are inserted into a tube made of PTFE, and the tube is then contracted by heating and pressurized in a mold to provide the covering body 24 on the thermosensitive element 21 and the lead wires 22.

As a material of the covering body 24, in addition to fluoro-rubber and silicone rubber, an appropriate elastic material such as natural rubber, isoprene rubber, styrene-butadiene rubber, butadiene rubber, chloroprene rubber, butyl rubber, ethylene-propylene rubber, an ethylene-vinyl acetate copolymer, chlorosulfonated polyethylene, chlorinated polyethylene, epichlorohydrin rubber, nitrile-butadiene rubber, nitrile isoprene rubber, and acrylic rubber can be used in consideration of necessary heat resistance.

In addition, the covering body 24 can be formed by using an appropriate resin material, for example, polyphenylene sulfide (PPS), polyamide (PA), polyimide (PI), polyether ether ketone (PEEK), polytetrafluoroethylene (PTFE), polysulfone (PSF/PSU), polyether imide (PEI), polycarbonate (PC), polypropylene (PP), polyvinylidene chloride (PVDC), polyacetal (POM), polyvinylidene fluoride (PVDF), perfluoroalkoxy alkane (PFA), a phenol resin (PF), unsaturated polyester (UP), an epoxy resin (EP), a silicone resin (SI), and polyurethane (PU).

To stably detect the temperature of the coil 11, when the holder 30 is fixed to the supporting body 12 (FIG. 1 and FIG. 3), the sensor element 20 is held by the holder 30 such that the second region 242 positioned on the other end side of the covering body 24 abuts on the temperature measurement object region 11R, and comes into contact with the temperature measurement object region 11R while elastically deforming. Therefore, the sensor element 20 is positioned to the coil end E, and is pressed against the coil end E so as not to be displaced in position.

The longitudinal direction Ld of the covering body 24 is inclined relative to an extending direction D4 (FIG. 1 and FIG. 3) in which wires of the coil 11 extend in the temperature measurement object region 11R. The covering body 24 is held by the holder 30 such that a boundary region 243 as a boundary between the first region 241 and the second region 242 elastically deforms and the second region 242 accordingly comes into contact with the temperature measurement object region 11R. Except for the boundary region 243, the first region 241 and the second region 242 extend straight or substantially straight, and the first region 241 and the second region 242 are inclined relative to each other. These forms are taken when the temperature sensor 2 is attached to the stator 10 of the rotary electric machine 1.

Figures 6A, 6B:
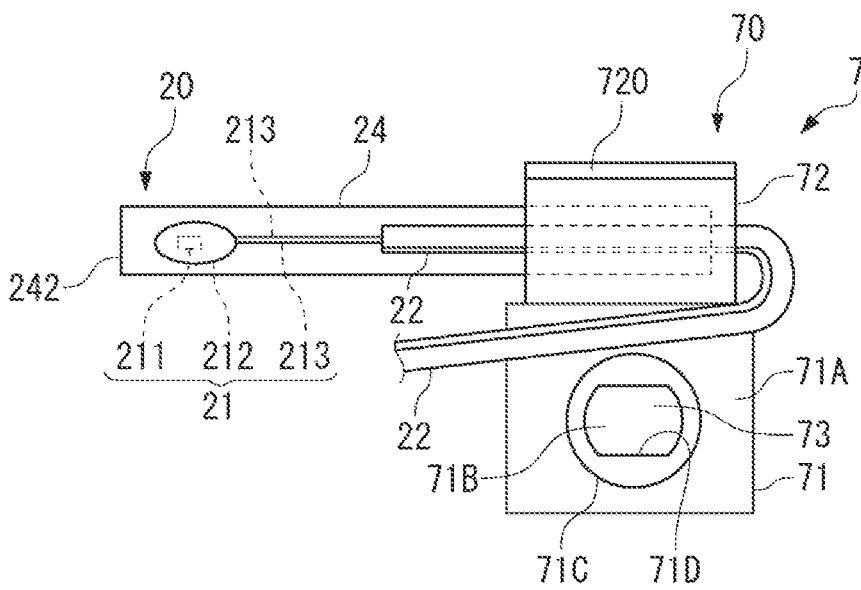
FIG. 6A is a schematic plan view illustrating a temperature sensor according to a modification.
FIG. 6B is a schematic plan view illustrating a state where the temperature sensor illustrated in FIG. 6A is in contact with a coil of a rotary electric machine.
Figure 7:
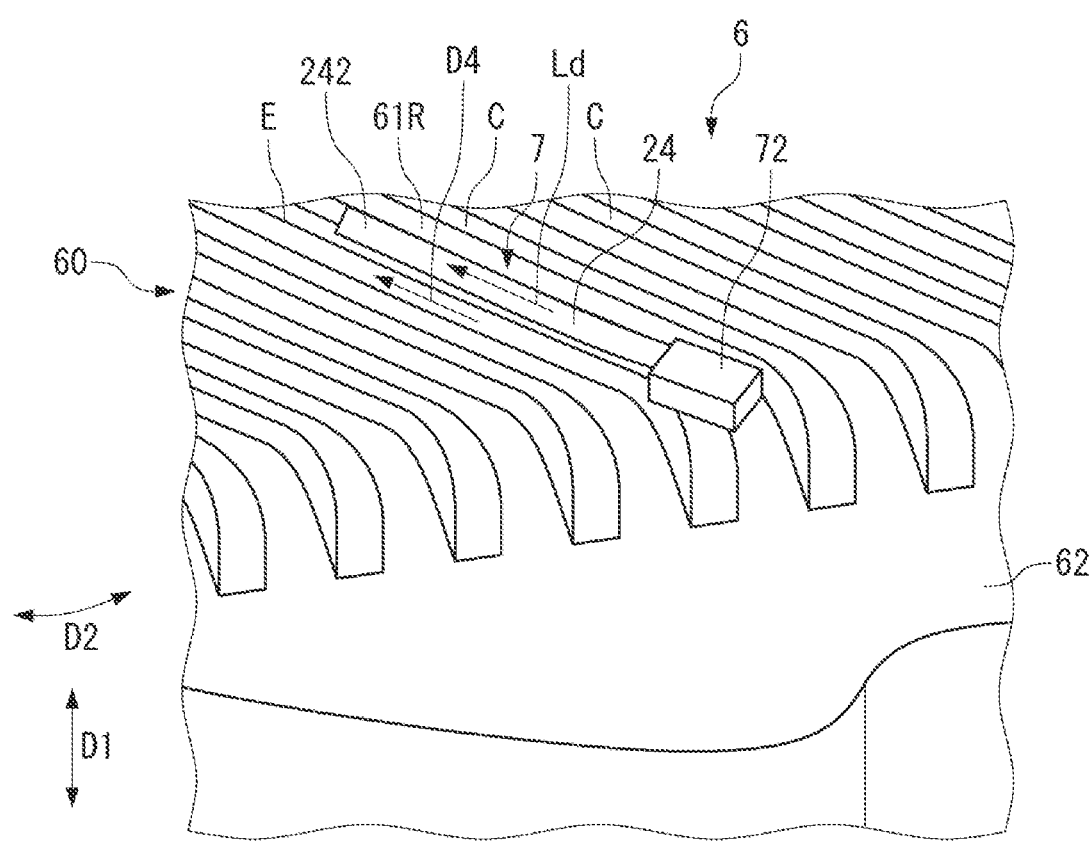
FIG. 7 is a schematic perspective view illustrating a state where the temperature sensor illustrated in FIG. 6A is pressed against the coil of the rotary electric machine.

In the temperature measurement object region 11R, the plurality of wires of the coil extend in parallel. A heat transfer area between the wires and the covering body 24 is desirably widely secured. Therefore, a posture of the covering body 24 is set such that the covering body 24 does not stride over the coil wires as much as possible in the direction in which the coil wires are arranged. In other words, the posture of the covering body 24 is set in a direction in which the second region 242 coming into contact with the coil 11 is disposed in parallel with the coil wires. This is true of a second embodiment (FIG. 4 and FIG. 5) and a modification (FIG. 6A, FIG. 6B and FIG. 7).

Next, the holder 30 is described with reference to FIGS. 2A and 2B, and FIG. 3.

The holder 30 is a holding member holding the temperature sensor 2 in a state where the temperature sensor 2 is in contact with the coil 11 of the rotary electric machine 1. The holder 30 is formed by injection molding of an appropriate resin material, for example, polyphenylene sulfide (PPS). In addition, as the material of the holder 30, for example, polyamide (PA), polyimide (PI), polyether ether ketone (PEEK), polytetrafluoroethylene (PTFE), polysulfone (PSF/PSU), polyether imide (PEI), polycarbonate (PC), polypropylene (PP), polyvinylidene chloride (PVDC), polyacetal (POM), polyvinylidene fluoride (PVDF), perfluoroalkoxy alkane (PFA), a phenol resin (PF), unsaturated polyester (UP), an epoxy resin (EP), a silicone resin (SI), and polyurethane (PU) can be used.

The holder 30 holds the first region 241 of the covering body 24, and is fixed to the supporting body 12. When the holder 30 is fixed to the supporting body 12, the sensor element 20 is positioned in a state where the second region 242 is pressed against the coil end E by elastic force of the covering body 24.

The holder 30 includes a fixed portion 31 fixed to the supporting body 12, and a holding portion 32 holding the first region 241 in a state where the covering body 24 is inclined toward the axial direction D1 relative to the temperature measurement object region 11R. The fixed portion 31 includes a coupling region 314 coupling the fixed portion 31 and the holding portion 32 with each other. The coupling region 314 enables the fixed portion 31 and the holding portion 32 to form the integrated holder 30.

The fixed portion 31 is disposed between the supporting pieces 121A and 121B substantially along the peripheral direction D2. The fixed portion 31 includes paired side walls 310 facing each other in the radial direction D3. Each of the paired side walls 310 includes a concave portion 312 defined by a U-shaped rib 311 surrounding three sides of the corresponding locking portion 121L, and a locking body 313 protruding from the concave portion 312 in the radial direction D3. When the locking portions 121L are received in the concave portions 312 while being guided by the ribs 311 along the axial direction D1, locking pawls 313N of the locking bodies 313 are inserted into the locking holes 121H, and the fixed portion 31 is accordingly locked to the supporting body 12 from the insides of the supporting pieces 121A and 121B. The fixed portion 31 is detachably fixed to the supporting body 12 by the locking pawls 313N and the locking holes 121H.

The holding portion 32 is to hold the first region 241 in a state where the covering body 24 is inclined toward the axial direction D1 relative to the temperature measurement object region 11R when the temperature sensor 2 is attached to the stator 10 to be in a mounted state. The holding portion 32 includes a covering-body holding region 321 holding the first region 241 of the covering body 24, a lead-wire holding region 322 holding the lead wires 22, and a supporting protrusion piece 323 (restriction portion) that protrudes from the covering-body holding region 321 toward the thermosensitive body 211 side and supports the covering body 24 from a side separated from the temperature measurement object region 11R in the axial direction D1. Further, the temperature sensor 2 is attached to the coupling region 314 having a substantially triangular shape in a side view, of the fixed portion 31. Therefore, the temperature sensor 2 is provided to be inclined relative to the fixed portion 31, and extends in a direction inclined toward the axial direction D1 side relative to the temperature measurement object region 11R. In other words, when attached to the holding portion 32, the covering body 24 is held in an inclined manner relative to the temperature measurement object region 11R, and is disposed in a state where the covering body 24 is separated from the temperature measurement object region 11R in the axial direction D1 from the second region 242 side toward the first region 241 side.

The covering-body holding region 321 holds the covering body 24 by surrounding a predetermined range on the first region 241 side of the covering body 24. An opening 321A into which the covering body 24 is inserted from the second region 242 side is provided in the covering-body holding region 321.

The lead-wire holding region 322 holds the paired lead wires 22 exposed from the covering body 24. The lead-wire holding region 322 according to the present embodiment is disposed to be shifted on one side in the radial direction D3 relative to the covering-body holding region 321. A notch 322A, into which portions 22B of the lead wires 22 bent relative to portions 22A near the covering body 24 are inserted, is provided in the lead-wire holding region 322.

The supporting protrusion piece 323 protrudes from a front end 321B of the covering-body holding region 321 toward the thermosensitive body 211, and is formed in a substantially rectangular shape as viewed from the axial direction D1.

The covering body 24 is received in the holding portion 32 from one side in the radial direction D3, and is supported in a cantilever manner by the covering-body holding region 321 on the first region 241 side. In other words, the holding portion 32 holds the covering body 24 in a cantilever manner such that the second region 242 in which the thermosensitive body 211 is positioned is disposed on the free end side. As illustrated in FIG. 2A, in a state where the temperature sensor 2 is not attached to the rotary electric machine 1, namely, in a state where the sensor element 20 is not attached to the coil 11, the covering body 24 is inclined relative to a fixing reference line Lc intersecting an axis (longitudinal direction Ld) of the sensor element 20. In addition, as illustrated in FIG. 2A, the free end (second region 242) and a portion held by the holding portion 32, of the covering body 24 stride over the fixing reference line Lc. In other words, the free end side of the covering body 24 protrudes from the fixing reference line Lc. Since a requirement in which the covering body 24 is inclined relative to the fixing reference line Lc and a requirement in which the free end (second region 242) and the portion held by the holding portion 32, of the covering body 24 stride over the fixing reference line Lc are satisfied, when the sensor element 20 is attached to the coil 11, the second region 242 can come into contact with the temperature measurement object region 11R.

The fixing reference line Lc is a line coincident with or parallel to an extending direction of parts of the fixed portion 31 directly relating to fixation to the supporting body 12. In the present embodiment, as illustrated in FIG. 1 and FIG. 3, the locking pawls 313N locked to the locking holes 121H of the supporting body 12 correspond to the parts directly relating to fixation. As illustrated in FIG. 3, in the state where the sensor element 20 is attached to the coil 11, the fixing reference line LC is parallel to a tangent Lt on an outer periphery of the coil 11. Accordingly, the covering body 24 is also inclined relative to the tangent Lt.

The covering body 24 from the first region 241 to the second region 242 extends in one direction. The supporting protrusion piece 323 restricts displacement of the covering body 24 in a direction separating from the temperature measurement object region 11R. When the lead wires 22 are inserted into the notch 322A of the lead-wire holding region 322 while the covering body 24 is housed in the covering-body holding region 321 from the opening 321A, the sensor element 20 is integrally assembled to the holder 30.

The lead wires 22 are locked to the lead-wire holding region 322, which makes it possible to prevent the sensor element 20 from being detached from the holder 30.

In the state where the sensor element 20 is assembled to the holder 30, when the assembly including the holder 30 and the sensor element 20 is disposed between the supporting pieces 121A and 121B, and the fixed portion 31 is pushed down relative to the supporting pieces 121A and 121B, the locking pawls 313N are locked to the locking portions 121L, and the holder 30 is accordingly fixed to the supporting body 12. Along therewith, as illustrated in FIG. 3, the second region 242 of the covering body 24 inclined relative to the temperature measurement object region 11R abuts on the temperature measurement object region 11R, and the boundary region 243 elastically deforms and is bent. Thus, the second region 242 comes into tight contact with and is pressed against the temperature measurement object region 11R. As a result, the sensor element 20 is positioned in the temperature measurement object region 11R, and the state is maintained. At this time, on an outer peripheral side of a curved shape of the covering body 24, the covering body 24 is exposed from the holder 30 over a range longer than a range on an inner peripheral side of the curved shape, and displacement of the covering body 24 in the direction separating from the temperature measurement object region 11R is restricted by the supporting protrusion piece 323. Therefore, deformation of the covering body 24 is not hindered, and the second region 242 is stably pressed against the temperature measurement object region 11R.

Effects by Present Embodiment

As described above, only the second region 242 of the covering body 24 held by the holder 30 comes into contact with the temperature measurement object region 11R of the coil 11 and is positioned, and the state is maintained. Therefore, it is unnecessary to position the sensor element 20 by pressing the sensor element 20 against the temperature measurement object region 11R by an arm or the like of a metal bracket. According to the present embodiment, it is sufficient for the temperature sensor 2 to include the thermosensitive element 21, the covering body 24 protecting the thermosensitive element 21 from an external force, and the resin holder 30 fixed to the supporting body 12. Therefore, it is possible to prevent the temperature sensor 2 from being displaced from the prescribed position of the coil 11 caused by an external force such as vibration and impact while suppressing the cost as compared with a case of including a metal member.

In addition, when the fixed portion 31 of the holder 30 is fixed to the supporting body 12, the second region 242 of the covering body 24 held by the holding portion 32 provided to be inclined relative to the fixed portion 31 comes into contact with the temperature measurement object region 11R. Therefore, as compared with a case where the temperature sensor 2 is inserted into the coil 11 while the holder 30 is elastically deformed, it is possible to easily attach and detach the temperature sensor 2 to/from the coil 11.

Further, since the longitudinal direction Ld of the covering body 24 is inclined relative to the extending direction D4 of the wires of the coil 11 in the temperature measurement object region 11R, the second region 242 disposed in parallel with the coil wires and the coil wires come into contact with each other in an area sufficient for heat transfer. This makes it possible to contribute to improvement in temperature detection accuracy and responsiveness.

Another embodiment that achieves effects similar to the effects by the first embodiment is described below.

Second Embodiment

The second embodiment is different from the above-described first embodiment in the direction in which the covering body 24 is pressed against the temperature measurement object region 11R.

Figure 4:
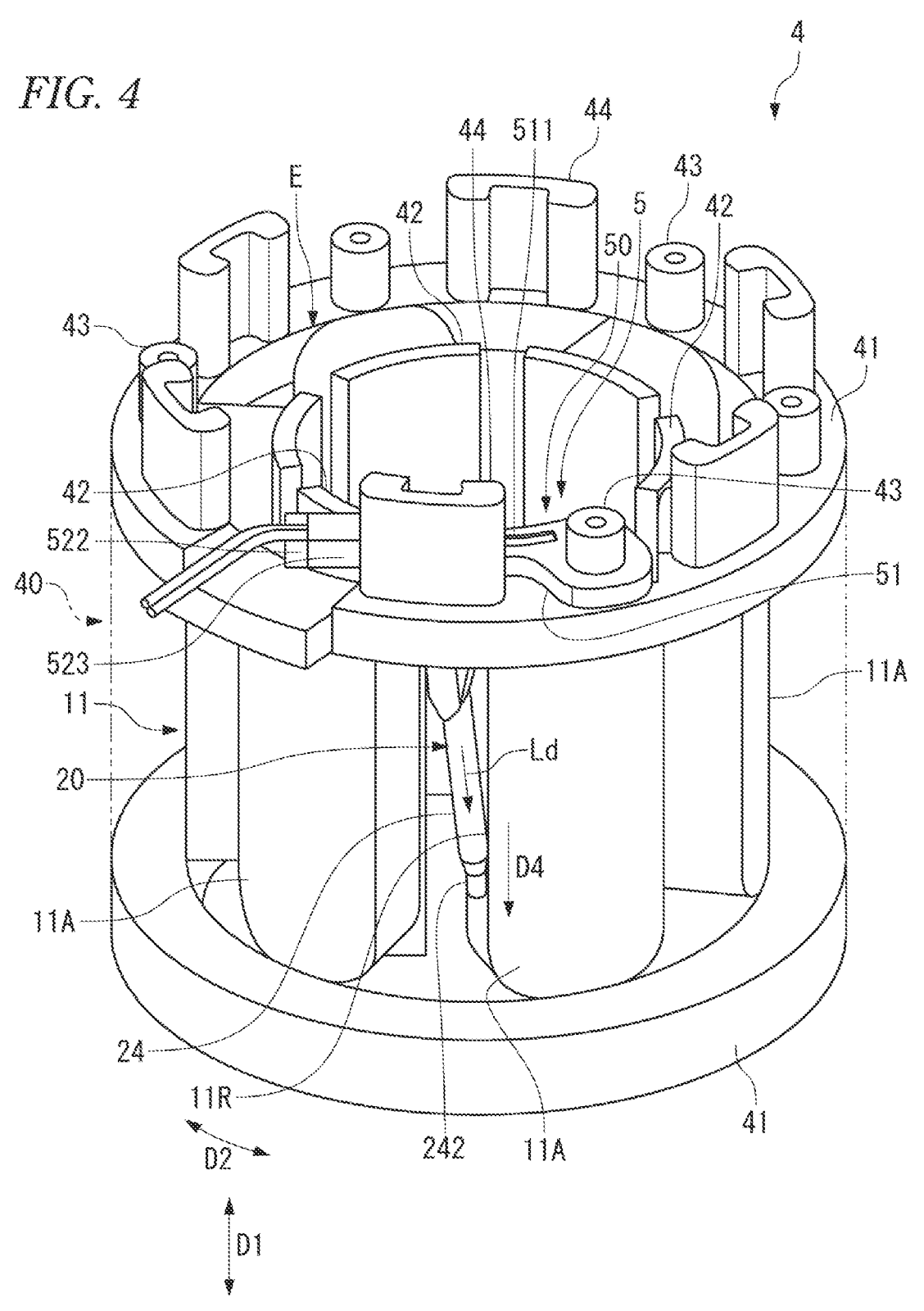
FIG. 4 is a perspective view illustrating a rotary electric machine and a temperature sensor according to the second embodiment.
Figure 5:
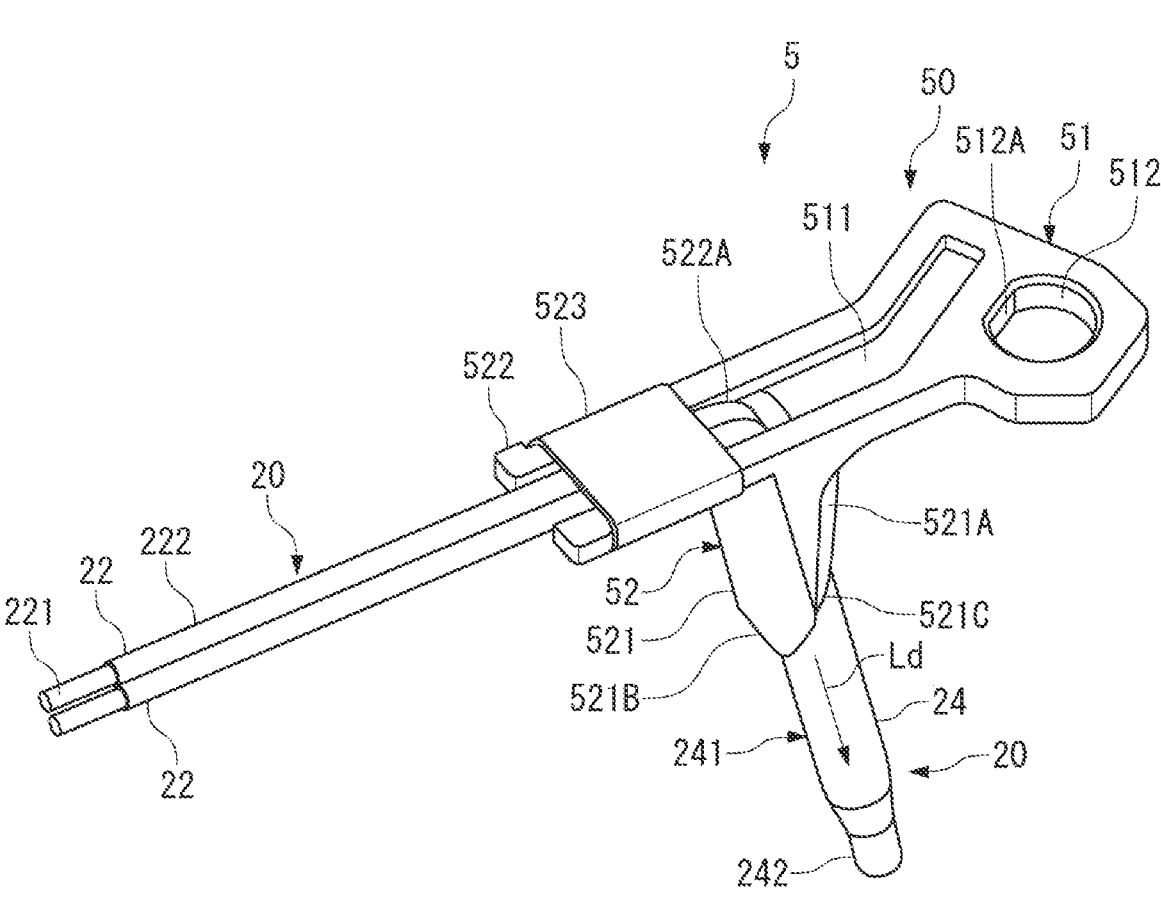
FIG. 5 is a perspective view illustrating the temperature sensor illustrated in FIG. 4.

A temperature sensor 5 illustrated in FIG. 4 and FIG. 5 is attached to a stator 40 of an electric motor 4, and detects the temperature of the coil 11 of the stator 40. The electric motor 4 is mounted on, for example, an electric power tool. The electric motor 4 includes the stator 40, an unillustrated rotor rotated relative to the stator 40, and the temperature sensor 5.

The stator 40 includes a core illustrated by an alternate long and two short dashes line, an insulating supporting body 41 that has a substantially annular shape and supports the core from one end side and the other end side in the axial direction D1, and the coil 11 wound around teeth provided on the core. Insulation members 42 supporting the coil 11 are disposed between the teeth and the coil 11.

The supporting body 41 positioned on an upper side in FIG. 4 includes a plurality of protrusions 43 protruding upward. The temperature sensor 5 and an unillustrated circuit board are attached to one of the protrusions 43.

The coil 11 corresponds to a concentrated winding coil, and includes a plurality of coil elements 11A arranged in the peripheral direction D2 of the stator 40.

As illustrated in FIG. 4, the temperature sensor 5 according to the second embodiment is disposed between any adjacent two of the coil elements 11A. The temperature sensor 5 is pressed against the temperature measurement object region 11R corresponding to one of facing surfaces of the adjacent coil elements 11A, in the peripheral direction D2.

The temperature sensor 5 includes the sensor element 20 including the thermosensitive element 21 and the covering body 24, and a holder 50 holding the sensor element 20.

The thermosensitive element 21 and the covering body 24 are configured substantially similarly to the thermosensitive element 21 and the covering body 24 according to the first embodiment, respectively. The second region 242 of the covering body 24 according to the second embodiment is formed in a tapered shape thinner than the other regions.

The holder 50 can be formed by injection molding of a resin material similar to the above-described holder 30. As with the holder 30 according to the first embodiment, the holder 50 holds the first region 241 of the covering body 24, is fixed to the supporting body 41, and positions the sensor element 20 in a state where only the second region 242 of the covering body 24 comes into contact with the temperature measurement object region 11R.

The holder 50 includes a fixed portion 51 fixed to the supporting body 41, and a holding portion 52 holding the sensor element 20.

The fixed portion 51 is formed in a substantially plate shape. The fixed portion 51 includes a groove 511 to increase a cross-sectional area and to enhance rigidity in a thickness direction, and a hole 512 penetrating through the fixed portion 51 in the thickness direction. The fixed portion 51 is disposed on the supporting body 41 in a state where one of the protrusions 43 is inserted into the hole 512, and is detachably fixed to the supporting body 41 with an unillustrated fixing tool provided on the protrusion 43. The holder 50 has an appropriate outer shape so as to be disposed on the supporting body 41 with avoiding a protruding portion 44 and the like near the protrusion 43. A flat surface 512A on an inner peripheral portion of the hole 512 and a flat surface on an outer peripheral portion of the protrusion 43 engage with each other, which regulates relative rotation of the holder 50 and the supporting body 41.

The holding portion 52 includes a covering-body holding region 521 holding the first region 241 of the covering body

24, and a lead-wire holding region 522 holding the paired lead wires 22 exposed from the covering body 24.

The covering body 24 is supported in a cantilever manner by the covering-body holding region 521 on the first region 241 side, and extends to the second region 242.

The covering-body holding region 521 protrudes downward with respect to the fixed portion 51, and is formed in a substantially cylindrical shape. The covering-body holding region 521 extends in a direction inclined toward the peripheral direction D2 relative to the temperature measurement object region 11R.

Further, in the covering-body holding region 521, a length of a portion 521B (restriction portion) separated in the peripheral direction D2 from the temperature measurement object region 11R is longer than a length of a portion 521A on a side close to the temperature measurement object region 11R when the holder 50 is fixed to the supporting body 41.

The lead-wire holding region 522 is adjacent to the fixed portion 51, and holds the lead wires 22 drawn out in a direction intersecting the longitudinal direction Ld of the covering body 24, inside a groove 522A.

When the covering body 24 is inserted into the covering-body holding region 521 from the second region 242 side, the lead wires 22 are bent and housed in the groove 522A, and a shrinkable tube 523 is provided in the lead-wire holding region 522 and is shrunk by heating, the sensor element 20 is assembled to the holder 50. The lead wires 22 are pressed inside the groove 522A by the shrinkable tube 523, which prevents the sensor element 20 from being detached from the holder 50. The shrinkable tube 523 is made of, for example, polyvinylidene fluoride (PVDF). In addition, the shrinkable tube 523 can be made of an appropriate material having heat shrinkability.

When the covering body 24 is inserted into the covering-body holding region 521, for example, an unillustrated step provided on the covering body 24 is locked to an unillustrated locking portion provided inside the covering-body holding region 521. As a result, the covering body 24 protrudes downward from the covering-body holding region 521 by a predetermined length. Alternatively, a diameter of the covering body 24 is gradually increased from the second region 242 toward the first region 241. When the covering body 24 is inserted into the covering-body holding region 521, the covering body 24 protrudes from the covering-body holding region 521 over a range where the diameter of the covering body 24 is less than an inner diameter of a front end part 521C.

In a state where the sensor element 20 is assembled to the holder 50, the fixed portion 51 and the lead-wire holding region 522 are disposed on the supporting body 41, and in a state where one of the protrusions 43 is inserted into the hole 512 of the fixed portion 51, the fixed portion 51 is fixed to the supporting body 41. As a result, the covering body 24 is held by the holding portion 52 in a state of being inclined toward the peripheral direction D2 relative to the temperature measurement object region 11R. Therefore, as illustrated in FIG. 4, the covering body 24 abuts on the temperature measurement object region 11R and deforms to a state of being curved along the temperature measurement object region 11R, and the second region 242 comes into tight contact with and is pressed against the temperature measurement object region 11R. As a result, the sensor element 20 is positioned in the temperature measurement object region 11R, and the state is maintained. At this time, on an outer peripheral side of a curved shape, namely, on the portion 521A side, the covering body 24 is exposed over a range longer than the portion 521B, and displacement of the covering body 24 in the direction separating from the temperature measurement object region 11R is restricted by the portion 521B positioned on an inner peripheral side of the curved shape. Therefore, deformation of the covering body 24 is not hindered, and the second region 242 is stably pressed against the temperature measurement object region 11R.

In addition, as in the first embodiment, when the fixed portion 51 of the holder 50 is fixed to the supporting body 41, the second region 242 of the covering body 24 held by the holding portion 52 provided to be inclined relative to the fixed portion 51 comes into contact with the temperature measurement object region 11R. Therefore, it is possible to easily attach and detach the temperature sensor 5 to/from the coil 11.

Further, as in the first embodiment, since the longitudinal direction Ld of the covering body 24 is inclined relative to the extending direction D4 of the wires of the coil 11 in the temperature measurement object region 11R, the second region 242 disposed in parallel with the coil wires and the coil wires come into contact with each other in an area sufficient for heat transfer. This makes it possible to contribute to improvement in temperature detection accuracy and responsiveness.

Modification

A modification is different from the above-described first embodiment and second embodiment in the direction in which the covering body 24 comes into contact with the temperature measurement object region.

A temperature sensor 7 illustrated in FIGS. 6A and 6B and FIG. 7 is attached to a stator 60 (FIG. 7) of a rotary electric machine 6 mounted on a vehicle or the like, and detects a temperature of a coil of the distributed winding stator 60. FIG. 6B and FIG. 7 each illustrate only the vicinity of the coil end E of the stator 60. The rotary electric machine 6 includes the stator 60, an unillustrated rotor rotated relative to the stator 60, and the temperature sensor 7. The coil end E is formed by coil wires C that are distributed in the peripheral direction D2 and wound around an unillustrated core, and protrudes from the core in the axial direction D1.

The temperature sensor 7 comes into contact with a temperature measurement object region 61R of the coil end E in the radial direction D3.

The temperature sensor 7 includes the sensor element 20 including the thermosensitive element 21 and the covering body 24, and a holder 70 holding the sensor element 20. The holder 70 can be formed by injection molding of a resin material similar to the above-described holder 30.

The thermosensitive element 21 and the covering body 24 are configured substantially similarly to the thermosensitive element 21 and the covering body 24 according to the first embodiment, respectively.

The holder 70 includes a fixed portion 71 fixed to a supporting body 62, and a holding portion 72 holding the covering body 24 in a cantilever state on the first region 241 side. A plate-like base 71A of the fixed portion 71 includes a hole 71B penetrating through the plate-like base 71A in a thickness direction, and includes a cylindrical body 71C protruding on a peripheral edge of the hole 71B.

For example, when the cylindrical body 71C and an unillustrated concave portion provided on the supporting body 62 are aligned, and an inside of the cylindrical body 71C and the concave portion of the supporting body 62 are filled with an adhesive 73, the holder 70 can be fixed to the supporting body 62. The supporting body 62 corresponds to a member provided in the stator 60 or an appropriate member disposed around the rotary electric machine 6.

To regulate rotation of the holder 70 relative to the supporting body 62, for example, the inner peripheral portion of the cylindrical body 71C preferably includes keys or width across flats (two parallel sides) 71D.

The holding portion 72 supports the covering body 24 in the state where the covering body 24 is inclined toward at least the radial direction D3 relative to the temperature measurement object region 61R, by surrounding the first region 241 of the covering body 24 inserted into the holding portion 72 from a side opening 720. Further, the covering body 24 is also inclined in a direction substantially similar to the direction in which the coil wires C extend, relative to an upper surface of the supporting body 62 orthogonal to the axial direction D1. In other words, the longitudinal direction Ld of the covering body 24 is inclined relative to the extending direction D4 in which the coil wires C extend in the temperature measurement object region 61R. The covering body 24 is inclined relative to the temperature measurement object region 61R both in a plan view and in a side view of the rotary electric machine 6.

The lead wires 22 drawn out from the first region 241 can be drawn out in an appropriate direction. Further, the sensor element 20 can be locked to the holder 70 by appropriate means.

The holding portion 72 may include a restriction portion restricting displacement of the covering body 24 in a direction separating from the temperature measurement object region 61R, similar to the supporting protrusion piece 323 of the holding portion 32 according to the first embodiment and the portion 521B of the holding portion 52 according to the second embodiment.

In a state where the sensor element 20 is assembled to the holder 70, the fixed portion 71 is fixed to the supporting body 62. Along therewith, as illustrated in FIG. 6B and FIG. 7, the covering body 24 abuts on the temperature measurement object region 61R and deforms to a state of being curved along the temperature measurement object region 61R, and the second region 242 comes into tight contact with and is pressed against the temperature measurement object region 61R. As a result, the sensor element 20 is positioned in the temperature measurement object region 61R. Further, the covering body 24 disposed in parallel with the coil wires C and the coil wires C come into contact with each other in a sufficient area. This makes it possible to contribute to improvement in temperature detection accuracy and responsiveness.

Other than the above description, the configurations described in the above-described embodiments can be selected or appropriately changed to other configurations without departing from the spirit of the present invention.

The temperature measurement object region of the coil according to the present invention may be set to a position different from the position in the above-described embodiments and the like. For example, the second region 242 may be pressed against the temperature measurement object region over the plurality of coil wires C by elastic force of the covering body 24 inserted into a gap between the coil wires C.

In the present invention, the resin holder that holds the covering body 24 and is fixed to the supporting body 12, 41, or 62 can have an appropriate shape. The fixed portion of the holder can be fixed to the supporting body by an appropriate method such as fastening, caulking, and adhesion using a member provided in the stator of the rotary electric machine or a member disposed around the rotary electric machine as the supporting body.

Further, the lead wires 22 can be drawn out in an optional direction from the covering body 24 held by the holder.

Each of the locking bodies 313 (locking pawls 313N) as the fixed portion 31 in the embodiment has a rectangular shape as an example; however, the present invention can adopt the other shapes such as an elliptical shape and a triangular shape. For example, in FIG. 3, in a case of elliptical locking bodies each having a major axis parallel to the peripheral direction D2, a tangent passing through a contact between a minor axis and a circumference serves as the above-described fixing reference line Lc. The contact in this case indicates a contact between the downward minor axis and the circumference in FIG. 3. In a case of triangular locking bodies each having a base facing the coil, a straight line overlapping with the base serves as the fixing reference line Lc.

Supplements

Configurations described below are grasped from the above description.

A temperature sensor detecting a temperature of a coil provided in a stator of a rotary electric machine, the temperature sensor including:

a sensor element including a thermosensitive body, an electric wire electrically connected to the thermosensitive body, and a covering body having an elongated shape and covering a part of the electric wire and the thermosensitive body; and a holder made of a resin and configured to hold one end region of the covering body on the electric wire side in a state where a longitudinal direction of the covering body is inclined relative to a temperature measurement object region of the coil, the holder being attached to the rotary electric machine in such a manner that another end region of the covering body on the thermosensitive body side is in contact with the temperature measurement object region.

(2) The temperature sensor according to (1), in which the longitudinal direction of the covering body is inclined relative to an extending direction of a wire of the coil extending in the temperature measurement object region with which the other end region comes into contact.

(3) The temperature sensor according to (1) or (2), in which the holder includes a holding portion configured to hold the one end region of the covering body, and a fixed portion configured to fix the sensor element to the rotary electric machine, and when the fixed portion is fixed to a supporting body provided in the rotary electric machine, the other end region of the covering body is positioned in the temperature measurement object region.

(4) The temperature sensor according to (3), in which the holding portion includes a restriction portion configured to restrict displacement of the covering body in a direction separating from the temperature measurement object region.

(5) The temperature sensor according to any one of (1) to (4), in which the covering body includes a resin member having elasticity, and the other end region is pressed against the temperature measurement object region by elastic force of the covering body.

(6) The temperature sensor according to any one of (1) to (5), in which the other end region comes into contact with a coil end of the coil in an axial direction of the stator.

(7) The temperature sensor according to any one of (1) to (5), in which at least the other end region of the covering body is disposed between elements, arranged in a peripheral direction of the stator, of the coil of a concentrated winding type, and the other end region comes into contact with the temperature measurement object region in the peripheral direction.

(8) The temperature sensor according to any one of (1) to (5), in which the other end region comes into contact with a coil end of the coil in a radial direction of the stator.

(9) A temperature sensor detecting a temperature of a coil provided in a stator of a rotary electric machine, the temperature sensor including:

a sensor element including a thermosensitive body, an electric wire electrically connected to the thermosensitive body, and a covering body covering a part of the electric wire and the thermosensitive body; and a holder made of a resin and configured to hold the sensor element and to fix the sensor element to the rotary electric machine, the holder including a fixed portion configured to fix the sensor element to the stator through a fixing reference line, and a holding portion configured to hold the covering body in a cantilever manner, to position the thermosensitive body on a free end side, the covering body being inclined relative to the fixing reference line, and the fixing reference line being positioned between the free end and a portion held in the cantilever manner.

(10) A temperature sensor detecting a temperature in a temperature measurement object region of a coil provided in a stator of a rotary electric machine, the temperature sensor including:

a sensor element including a thermosensitive body, an electric wire electrically connected to the thermosensitive body, and a covering body covering a part of the electric wire and the thermosensitive body; and a holder made of a resin and configured to hold the sensor element and to fix the sensor element to the rotary electric machine, the holder including a fixed portion configured to fix the sensor element to the stator, and a holding portion configured to hold the covering body in a cantilever manner, to position the thermosensitive body on a free end side, and the covering body including a first region inclined relative to the temperature measurement object region, and a second region communicating with the first region and coming into contact with the temperature measurement object region in a state of being inclined relative to the first region.

(11) A rotary electric machine, comprising:

a stator including a core and a coil;

a rotor configured to be rotated relative to the stator; and the temperature sensor according to any one of (1) to (10) configured to detect a temperature of the coil.

What is claimed is:

1. A temperature sensor detecting a temperature of a coil provided in a stator of a rotary electric machine, the temperature sensor comprising:

a sensor element including a thermosensitive body, an electric wire electrically connected to the thermosensitive body, and a covering body having an elongated shape and covering a part of the electric wire and the thermosensitive body; and a holder made of a resin and configured to hold one end region of the covering body on the electric wire side in a state where a longitudinal direction of the covering body is inclined relative to a temperature measurement object region of the coil, the holder being attached to the rotary electric machine in such a manner that another end region of the covering body on the thermosensitive body side is in contact with the temperature measurement object region, wherein the holder includes a holding portion configured to hold the one end region of the covering body, and a fixed portion configured to fix the sensor element to the rotary electric machine, wherein when the fixed portion is fixed to a supporting body provided in the rotary electric machine, the other end region of the covering body is positioned in the temperature measurement object region, wherein the covering body covers the entire thermosensitive body, and wherein the holder and the sensor element are separate members.

2. The temperature sensor according to claim 1, wherein the longitudinal direction of the covering body is inclined relative to an extending direction of a wire of the coil extending in the temperature measurement object region with which the other end region comes into contact.

3. The temperature sensor according to claim 1, wherein the holding portion includes a restriction portion configured to restrict displacement of the covering body in a direction separating from the temperature measurement object region.

4. The temperature sensor according to claim 1, wherein the covering body includes a resin member having elasticity, and the other end region is pressed against the temperature measurement object region by elastic force of the covering body.

5. The temperature sensor according to claim 4, wherein the other end region comes into contact with a coil end of the coil in an axial direction of the stator.

6. The temperature sensor according to claim 4, wherein at least the other end region of the covering body is disposed between elements, arranged in a peripheral direction of the stator, of the coil of a concentrated winding type, and the other end region comes into contact with the temperature measurement object region in the peripheral direction.

7. The temperature sensor according to claim 4, wherein the other end region comes into contact with a coil end of the coil in a radial direction of the stator.

8. A rotary electric machine, comprising:

a stator including a core and a coil;

a rotor configured to be rotated relative to the stator; and the temperature sensor according to claim 1 configured to detect a temperature of the coil.

9. A temperature sensor detecting a temperature of a coil provided in a stator of a rotary electric machine, the temperature sensor comprising:

a sensor element including a thermosensitive body, an electric wire electrically connected to the thermosensitive body, and a covering body covering a part of the electric wire and the thermosensitive body; and a holder made of a resin and configured to hold the sensor element and to fix the sensor element to the rotary electric machine, the holder including a fixed portion configured to fix the sensor element to the stator through a fixing reference line, and a holding portion configured to hold the covering body in a cantilever manner, to position the thermosensitive body on a free end side, the covering body being inclined relative to the fixing reference line, and the fixing reference line being positioned between the free end and a portion held in the cantilever manner, wherein the covering body covers the entire thermosensitive body, wherein the holder and the sensor element are separate members, and wherein the holding portion holds the covering body such that the thermosensitive body is positioned away from the holding portion in a longitudinal direction of the covering body and the thermosensitive body is positioned towards the free end relative to the holding portion.

10. A rotary electric machine, comprising:

a stator including a core and a coil;

a rotor configured to be rotated relative to the stator; and the temperature sensor according to claim 9 configured to detect a temperature of the coil.

11. A temperature sensor detecting a temperature in a temperature measurement object region of a coil provided in a stator of a rotary electric machine, the temperature sensor comprising:

a sensor element including a thermosensitive body, an electric wire electrically connected to the thermosensitive body, and a covering body covering a part of the electric wire and the thermosensitive body; and a holder made of a resin and configured to hold the sensor element and to fix the sensor element to the rotary electric machine, the holder including a fixed portion configured to fix the sensor element to the stator, and a holding portion configured to hold the covering body in a cantilever manner, to position the thermosensitive body on a free end side, and the covering body including a first region inclined relative to the temperature measurement object region, and a second region communicating with the first region and coming into contact with the temperature measurement object region in a state of being inclined relative to the first region, wherein the covering body covers the entire thermosensitive body, and wherein the holder and the sensor element are separate members.

12. A rotary electric machine, comprising:

a stator including a core and a coil;

a rotor configured to be rotated relative to the stator; and the temperature sensor according to claim 10 configured to detect a temperature of the coil.

* * * * *